3,400,109
RUBBER POLYMER TREATMENT PROCESS
Clyde H. Mathis, Borger, Tex., assignor to Phillips
Petroleum Company, a corporation of Delaware
No Drawing. Filed Oct. 17, 1963, Ser. No. 317,080
7 Claims. (Cl. 260—85.1)

This invention relates to a process for the treatment of rubber polymers. In another aspect, this invention relates to the improved treatment of a rubber polymer using sulfamic acid.

A considerable number of polymerization processes by which polymers of conjugated dienes of controlled structure can be prepared have been commercially developed. These polymer products have found wide utility replacing, at least in part, the older synthetic resins and rubbers. In many instances, the color of these rubber polymers is an important factor. The rubber polymer products are normally relatively dark, and light-colored or colorless rubber polymers are desired in many instances.

I have discovered that a significant reduction in color can be obtained if sulfamic acid is employed in the coagulation step as a substitute for the acid normally employed in the coagulation step. I have further discovered that improvement in color is obtained when the pH in the coagulation zone is raised above that normally employed (less coagulation acid required) and the concentration of brine and gelatin in the coagulation zone reduced below that normally employed. I have also discovered that yet a further improvement in color is effected by reducing the drying of the rubber polymer recovered from the coagulation step.

Accordingly, an object of my invention is to provide diene polymers of reduced color content.

Another object of my invention is to provide an improved rubber polymer treatment process.

Other objects, advantages and features of my invention will be readily apparent to those skilled in the art from the following description and the appended claims.

The invention is applicable to a large number of diene polymers produced by an emulsion polymerization process, most of these having been prepared from conjugated dienes containing from 4 to 8 carbon atoms.

Examples of conjugated dienes which can be employed include 1,3-butadiene, isoprene, 2,3-dimethylbutadiene, 2-methoxybutadiene, 1,3-hexadiene, and 1,3-octadiene. These conjugated dienes can be polymerized either alone or in admixture with each other and/or with one or more other compounds containing an active $CH_2=C$ group which are copolymerizable therewith. Suitable comonomers containing this group include styrene, acrylonitrile, methyl acrylate, methyl methacrylate, vinyl chloride, methyl vinyl ether, ethylene, propylene, 1-butene, 1-propene, 1-octene and the like.

The above synthetic rubbery polymers can be produced by a number of well-known processes. For example, emulsion polymerization of butadiene with ethylenically unsaturated and vinylpyridine-containing monomers, such as styrene and the vinylpyridines, is a well-established process. A suitable method is emulsion polymerization of a conjugated diene alone or with other copolymerizable monomers at 0° to 140° F. in such systems as the iron pyrophosphate, either sugar-free or containing sugar, and the persulfate recipes. Any suitable emulsifier such as fatty or rosin acid soaps or the like can be employed. These recipes normally contain 1-9 parts by weight of the emulsifier per 100 parts of monomer.

The vinylpyridine component employed has the structural formula

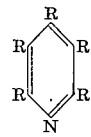

wherein R is hydrogen or the alkyl, vinyl and alpha-methyl-vinyl (isoprenyl) groups, with at least one and not more than two of the groups being vinyl or alpha-methyl-vinyl groups, and the total number of carbon atoms in the alkyl groups being not greater than 12. The preferred alkyl groups are the methyl and ethyl, some examples of these compounds are: 2-vinylpyridine, 2,5-vinylpyridine, 2-methyl-5-vinylpyridine, 2,3,4-trimethyl-5-vinylpyridine, 3-ethyl-5-vinylpyridine, 5-ethyl-2-vinylpyridine, and the like. The conjugated dienes employed are usually those containing 4 to 6 carbon atoms per molecule such as 1,3-butadiene, isoprene, piperylene, methylpentadiene, 2,3-dimethyl-1,3-butadiene, chloroprene, and others. Conjugated dienes of more than 6 carbon atoms can be employed, as well as the various alkoxy, such as methoxy and ethoxy, and cyano derivatives. In the preparation of the copolymers, the amount of the conjugated diene usually is generally in the range of 50–98 parts by weight per 100 parts of monomer with the vinylpyridine component in the range 50–2 parts.

If polymerization is to be terminated, a shortstop and an antioxidant are added and the more volatile component, such as the 1,3-butadiene, is recovered by an appropriate flashing method. The product latex is then, preferably, diluted with water and creamed with a saturated brine solution. The process of this invention is, however, not limited to creaming since the invention can be practiced without creaming.

The latex and brine mixture is contacted with a coagulation acid and the latex-brine-acid mixture passed to a coagulation vessel. Conventionally, when sulfuric acid is employed as the coagulation acid, sufficient acid is added to the mixture to provide a coagulation mixture having a pH in the range of 1–4 and the concentration of brine in the coagulation vessel is such so as to produce a mixture having a salt concentration in the range of 4 to 5 percent by weight in water. By so controlling the pH of the coagulation mixture and the concentration of salt in the coagulation mixture, a product rubber crumb having uniform particle size is produced and the formation of fines is minimized.

With the employment of sulfamic acid as the coagulating acid, it has been discovered that a rubber crumb having uniform particle size, and with the formation of fines minimized, is produced when the pH of the coagulation mixture is maintained in the range of 4–6 and the concentration of brine in the coagulation vessel such so as to produce a mixture having a salt concentration in the range of 3 to 4 weight percent in water. An advantage of the inventive process is readily apparent when it is noted that by operating at a higher pH and a lower salt concentration, a substantial improvement in the coagulation process has been effected by reducing chemical cost.

In the conventional process gelatin is employed in the coagulation vessel, thereby permitting the coagulation of the rubber in the form of discrete, noncoherent crumbs which may be readily filtered, washed and dried. The crude rubber thus formed has considerably lower water-absorption properties than similar rubbers coagulated by means of sulfuric acid alone or acid and brine. It has been discovered that by employing sulfamic acid in the coagulation step, the use of gelatin in the coagulation step is not required to aid in the control of the coagulation of the rubber crumb and that the crude rubber crumb formed in the sulfamic acid coagulation step has a water-absorption porperty at least as low as the water-absorption property of rubbers coagulated by means of sulfuric acid, brine and gelatin.

After coagulation the serum and crumb are separated by suitable means such as by decantation, filtration or the like. The rubber crumb can then be washed with dilute caustic if desired. The rubber crumb is then washed with water and preferably squeezed to displace liquid therein so as to substantially completely remove the caustic (if employed) and salt from the crumb.

By employing sulfamic acid in the coagulation step, a product rubber crumb is produced substantially improved in color over the corresponding rubber crumb product produced wherein sulfuric acid is employed in the coagulation step. This is to say that the rubber crumb product produced wherein sulfamic acid is employed in the coagulation step is lighter in color than the corresponding rubber crumb product produced by a sulfuric acid coagulation step.

An additional advantage of the invention is that there is a substantial improvement in the drying characteristic of the product rubber crumb produced with sulfamic acid over the corresponding rubber crumb produced wherein sulfuric acid is employed in the coagulation step. This improvement substantially increases dryer throughput, thereby substantially increasing the efficiency of the rubber polymer treatment process. Further advantages of the invention are that iron contamination of the product rubber crumb is reduced when employing sulfamic acid and corrosion problems are reduced by operating the coagulation step at a higher pH.

The following example is presented as illustrative of the effectiveness of the invention. It is not intended that the invention should be limited to the specific embodiments illustrated therein.

Example

In the production of Philprene 1006, a styrene-butadiene polymer containing 23.5 weight percent bound styrene, a latex containing 22 weight percent solids was passed to a coagulation vessel at the rate of 37 gallons per minute. In Run 1, sulfuric acid was employed in the coagulation step. In Run 2, sulfamic acid was employed in the coagulation step. Other run conditions and the results obtained are presented in the following table:

TABLE

| Condition | Run 1 | Run 2 |
|---|---|---|
| Coagulation, pH | 2.5 | 5.0 |
| Latex flow, gal./min | 37.0 | 37.0 |
| Latex solids, wt. percent | 22.0 | 22.0 |
| Brine flow, gal./min | 30.0 | 19.0 |
| Brine concentration, wt. percent | 9.0 | 9.0 |
| Salt in coagulation serum, wt. percent | 4.7 | 3.7 |
| Gelatin flow, gal./min | 0.5 | None |
| Gelatin concentration, wt. percent | 1.5 | |

In each of Runs 1 and 2, a uniform particle size rubber crumb was produced. The color of the rubber crumb produced in Run 1 was of Grade 2 and the color of the rubber crumb produced in Run 2 was of Grade 1 employing the following grading basis:

(1) Color substantially improved over an acceptable standard.
(2) Standard.
(3) Color poorer than the normal standard.

In comparison of the runs, it is noted that in Run 2 less brine was employed, the coagulation pH was higher (less acid required), and no gelatin was employed while producing a rubber crumb product of improved color.

Various modifications of this invention can be made, or followed, in view of the foregoing, without departing from the spirit or scope thereof.

I claim:

1. In a process wherein a latex produced by an emulsion polymerization process is coagulated, the emulsifying agent used in the polymerization process being selected from the group consisting of fatty acid soaps, resin acid soaps, and mixtures thereof, an improvement which comprises employing sulfamic acid as the coagulating acid.

2. The process of claim 1 wherein the pH in the coagulation zone is maintained in the range of 4–6.

3. A process which comprises passing a latex produced by an emulsion polymerization process to a coagulation zone, the emulsifying agent used in the polymerization process being selected from the group consisting of fatty acid soaps, resin acid soaps, and mixtures thereof, passing brine to said coagulation zone, passing sulfamic acid to said coagulation zone, and recovering a coagulated rubber polymer from said coagulation zone.

4. The process of claim 3 wherein the pH in said coagulation zone is maintained in the range of 4–6.

5. The process of claim 4 wherein the concentration of salt in said coagulation zone is maintained in the range of 3–4 weight percent in water.

6. The process of claim 3 wherein the pH maintained in said coagulation zone is 5.0 and the weight percent of salt in said coagulation zone is 3.7.

7. A process according to claim 3 wherein butadiene and styrene are copolymerized in said emulsion polymerization process.

References Cited

UNITED STATES PATENTS 2,761,563   9/1956   Waterman et al. _____ 210—21
3,092,603   6/1963   Gauslaa et al. _____ 260—821
3,108,983   10/1963  Barclay _____ 260—85.1

JOSEPH L. SCHOFER, Primary Examiner.

H. WONG, H. I. CANTOR, Assistant Examiners.